(12) United States Patent
Hashimoto

(10) Patent No.: US 7,035,669 B2
(45) Date of Patent: Apr. 25, 2006

(54) MOBILE COMMUNICATIONS SYSTEM, RADIO BASE STATION CONTROL SYSTEM, AND RADIO BASE STATION CONTROL METHOD

(75) Inventor: Yukio Hashimoto, Tokyo (JP)

(73) Assignee: NEC Corporation, (JP)

(*) Notice: Subject to any disclaimer, the term of this patent is extended or adjusted under 35 U.S.C. 154(b) by 294 days.

(21) Appl. No.: 10/733,104

(22) Filed: Dec. 10, 2003

(65) Prior Publication Data

US 2004/0121806 A1   Jun. 24, 2004

(30) Foreign Application Priority Data

Dec. 12, 2002   (JP) .............................. 2002-360990

(51) Int. Cl.
   *H04Q 7/20* (2006.01)
(52) U.S. Cl. ...................... 455/560; 455/424; 455/502
(58) Field of Classification Search ............. 455/422.1, 455/428, 424, 425, 445, 502, 550.1, 560, 455/552.1–553; 370/335, 350; 340/870.02, 340/870.11
See application file for complete search history.

(56) References Cited

U.S. PATENT DOCUMENTS

| | | | | |
|---|---|---|---|---|
| 5,261,118 A * | 11/1993 | Vanderspool et al. | ...... | 455/503 |
| 5,515,366 A * | 5/1996 | Chieu et al. | ................. | 370/347 |
| 5,550,992 A * | 8/1996 | Hashimoto | ............... | 455/422.1 |
| 5,565,862 A * | 10/1996 | Hubbard et al. | ....... | 340/870.11 |
| 6,243,372 B1* | 6/2001 | Petch et al. | .................. | 455/502 |
| 6,359,870 B1* | 3/2002 | Inoue et al. | ................. | 370/337 |
| 6,483,825 B1* | 11/2002 | Seta | ........................... | 455/502 |
| 6,621,813 B1* | 9/2003 | Petch et al. | .................. | 455/502 |
| 6,704,548 B1* | 3/2004 | Jeong | .......................... | 455/560 |
| 6,885,867 B1* | 4/2005 | Matsuoka | ................... | 455/436 |
| 2002/0196886 A1* | 12/2002 | Adkisson | ................... | 375/362 |
| 2004/0121806 A1* | 6/2004 | Hashimoto | .................. | 455/560 |

FOREIGN PATENT DOCUMENTS

| | | |
|---|---|---|
| JP | 4162840 | 6/1992 |
| WO | WO 03/086003 A1 | 10/2003 |

OTHER PUBLICATIONS

Search Report from British Patent Office issued Jun. 10, 2004 in connection with corresponding application No. GB0328308.2.

* cited by examiner

*Primary Examiner*—Joseph Feild
*Assistant Examiner*—Kamran Afshar
(74) *Attorney, Agent, or Firm*—Ostrolenk, Faber, Gerb & Soffen, LLP

(57) ABSTRACT

An object of the present invention is to provide efficient RFN timing passing between a User Plane Server (UPS) and Radio Control Server (RCS). In a radio base station control system that controls a radio base station device communicating with a mobile terminal over a radio link and includes an RCS performing signaling transfer control and a UPS performing user data transfer control relating to the terminal, the RCS and UPS being provided physically separated from each other, the RCS includes inquiry means for sending an inquiry signal for inquiring about timing information of the UPS, the timing information being required for signaling transfer control and being managed by the UPS; and the UPS includes sending means for sending the RFN to the RCS when the UPS receives the inquiry signal.

14 Claims, 7 Drawing Sheets

MOBILE COMMUNICATIONS SYSTEM, RADIO BASE STATION CONTROL SYSTEM, AND RADIO BASE STATION CONTROL METHOD

BACKGROUND OF THE INVENTION

1. Field of the Invention

The present invention relates to a mobile communications system and method that control a radio base station controllers sending and receiving a radio signal to and from mobile terminals.

2. Description of the Related Art

A radio access network (RAN) in a mobile communications system consists of radio base stations and base station control devices that control the base stations.

Figure 1:
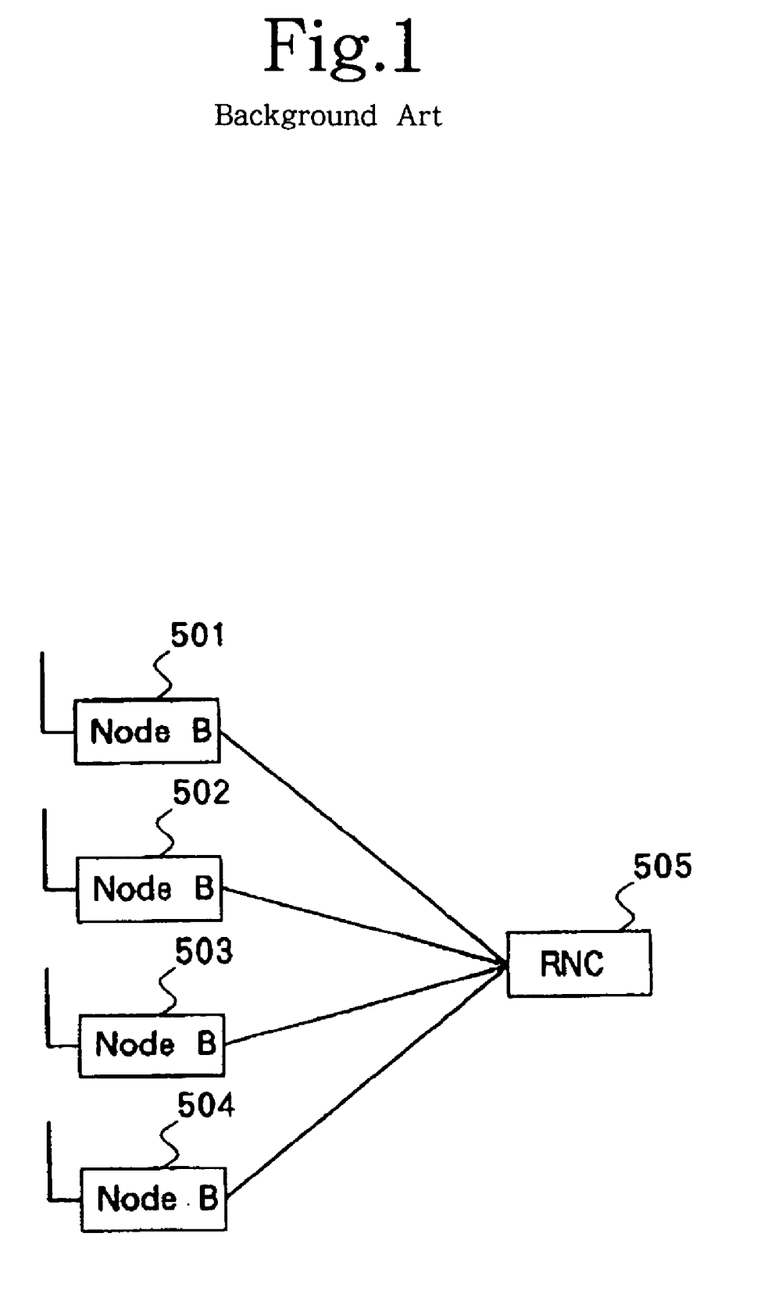
FIG. 1 shows a network configuration according to the background art.

A RAN based on 3GPP (3rd Generation Partnership Projects) specification is called a UMTS Terrestrial Radio Access Network (UTRAN) and includes a number of radio base stations (Node B) 501–504 and a Radio Network Controller (RNC) 505 as shown in FIG. 1. RNC 505 handles signaling control information relating to radio access as well as handling user data such as audio and video. A Control Plane (C-plane) provides signaling transfer control, and a User Plane (U-plane) handles user data such as audio and video data.

In recent years, an approach has been proposed that divides the C-plane and the U-plane in an RNC and provides a number of U-planes for each C-plane. In the following description, a C-plane section is called an RCS (Radio Control Server) and a U-plane section is called a UPS (User Plane Server).

Figure 2:
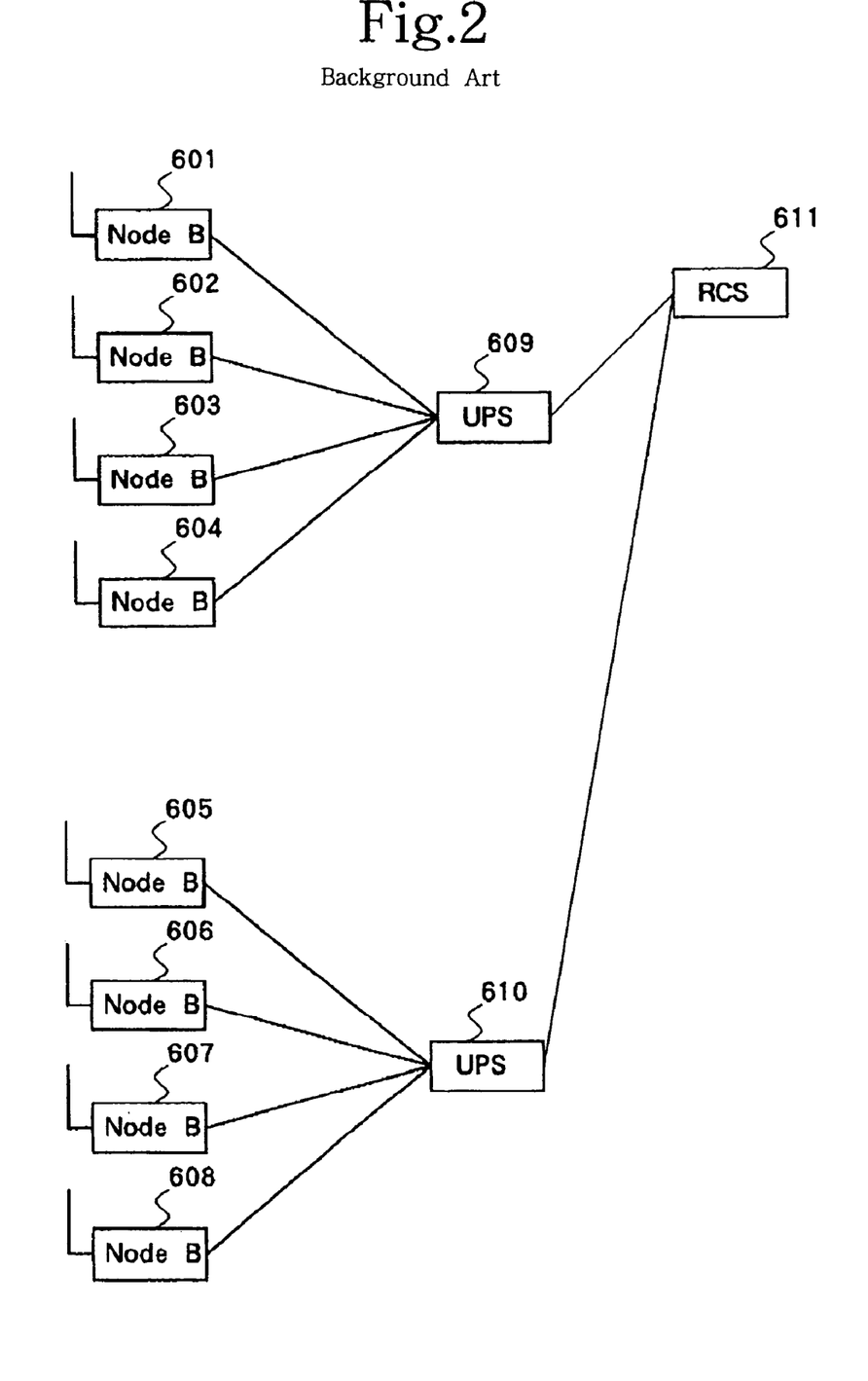
FIG. 2 shows a network configuration according to the background art.

FIG. 2 is a block diagram showing a configuration of such a mobile communication system. Included in the system are UPS 609 provided for radio base stations (Node B) 601–604, UPS 610 provided for radio base stations (Node B) 605–608, and one RCS 611 provided for UPS 609 and UPS 610.

Figure 3:
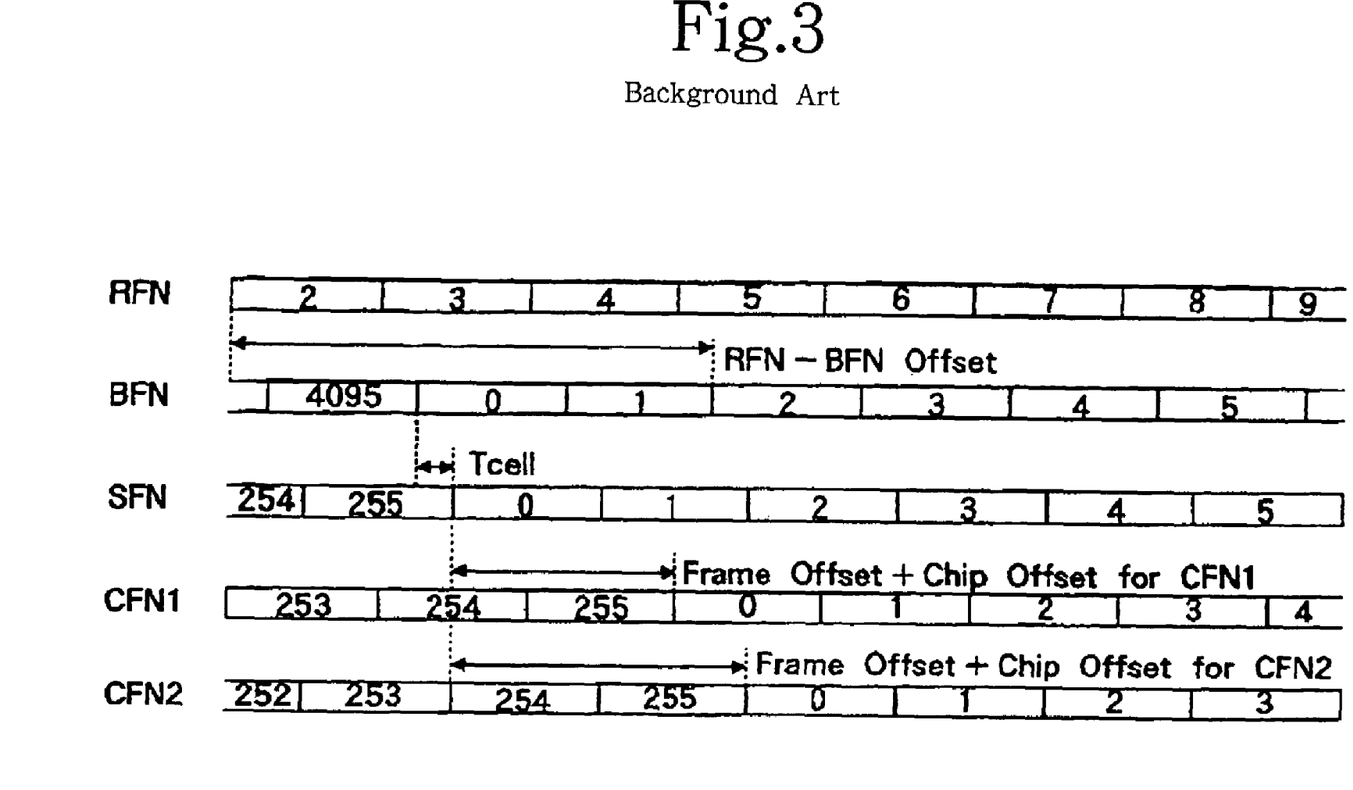
FIG. 3 shows a relationship between items of timing information in a UTRAN.

In the UTRAN described above, an RNC frame number (RFN), Node B frame number (BFN), a cell system frame number (SFN), and a connection frame number (CFN) are provided as timing information. FIG. 3 shows the relationships between these items of timing information. The items of timing information are defined as follows:

(1) The RNC uses RFN as timing reference and Node B uses BFN as its timing reference.
(2) RFN and BFN have a frame length of 10 ms and are controlled with a cycle length of 4096 frames, in the range from 0 to 4095 frames.
(3) The phase difference between RFN and BFN can be measured by a mechanism called Node Synchronization.
(4) The frame numbers indicating timing of a cell under the control of Node B is called SFN. The output timing of each cell is determined by an offset relative to BFN called Tcell.
(5) A user equipment (UE) such as a mobile phone that is in communication in a cell is also communicating with the UTRAN by using CFN. The timing of CFN is determined by a frame offset relative to SFN and a chip offset.

Details of the architecture described above are specified in 3GPP (3rd Generation Partnership Projects).

The Tcell, frame offset, chip offset for associating the items of timing information described above are values specified by the RNC and the phase difference between RFN and BFN can be measured by Node Synchronization. Accordingly, all of these values are held by the RNC.

The RNC must know the CFN defined for each UE in order to indicate the timing to the UE. For example, CFN is used to specify activation time at which the encription function of user information flying over the radio is activated and start time at which Radio link Reconfiguration is performed for configuring a radio link.

CFN of each UE can be obtained by calculating the offsets (Tcell, frame offset, chip offset, and the phase difference between RFN and BFN) described from RFN timing of the RNC. In particular, BFN timing can be obtained from RFN timing, SFN timing can be obtained from the BFN timing, and CFN timing of each UE can be obtained from the SFN timing.

In a configuration in which a single radio network controller controls a number of radio base stations as shown in FIG. 1, the radio network controller controls these timings. Therefore, the calculation of the CFN timing of each individual UE on the basis of RFN timing as described above can be calculated by the single radio network controller. In contrast, in a configuration in which a radio network controller is made up of an RCS and a UPS, RFN timing is controlled in the UPS as shown in FIG. 2. Therefore, the RCS must in some way know the RFN timing managed in the UPS. However, no protocol for how an RCS gets to know RFN timing managed in a UPS.

SUMMARY OF THE INVENTION

The present invention has been made in light of the problem with the related art and an object of the present invention is to provide a system and method that allow RFN timing to be passed efficiently between a user plane server (UPS) and a radio control server (RCS).

BRIEF DESCRIPTION OF THE DRAWINGS

FIG. 4(*a*) shows a configuration of a relevant part of a first embodiment of the present invention and FIG. 4(*b*) shows a configuration of a relevant part of a second embodiment of the present invention;

FIG. 5(*a*) shows a configuration of a relevant part of a third embodiment of the present invention and FIG. 5(*b*) shows a configuration of a relevant part of a fourth embodiment of the present invention;

DETAILED DESCRIPTION OF THE PREFERRED EMBODIMENTS

Embodiments of the present invention will be described below with reference to the accompanying drawings.

Figure 4:
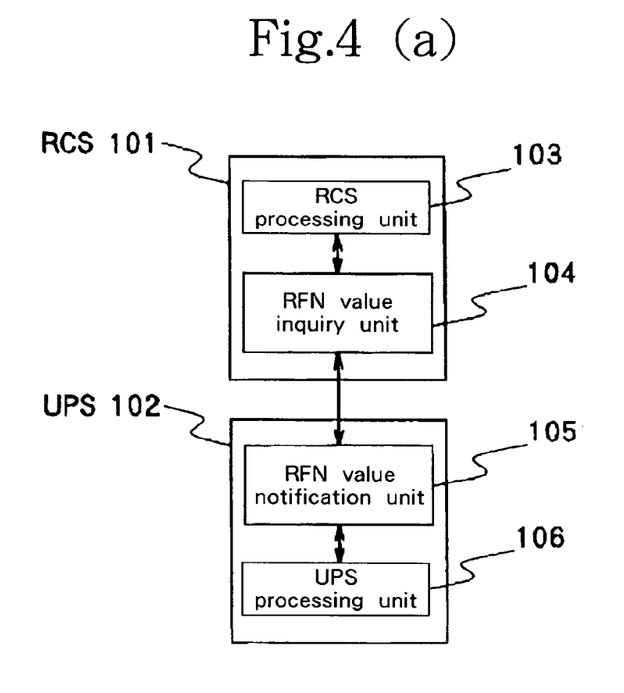

FIG. 4(*a*) is a block diagram showing a configuration of a relevant part of a first embodiment of the present invention. The embodiment shown in FIG. 4(*a*) comprises an RCS 101, which is a first control means, and a UPS 102, which is a second control means. The RCS 101 comprises an RCS processing unit 103 that performs processing required for functioning as an RCS and an RFN value inquiry unit 104. The UPS 102 comprises a UPS processing unit 106 that performs processing required for functioning as a UPS and an RFN value notification unit 105.

Among items of timing information, Tcell, frame offsets, and chip offsets are specified by the RCS processing unit 103. RFN timing is managed by the UPS processing unit 106. The RCS processing unit 103 inquires about an RFN value through the RFN value inquiry unit 104 to the UPS 102 when the RCS processing unit 103 requires RFN timing. The inquiry is received at the RFN value notification unit 105. The RFN value notification unit 105 reads the RFN timing from the UPS processing unit 106 and sends it to the RCS 101. It sends the phase difference between RFN and BFN obtained by the UPS processing unit 106 from the result of Node synchronization to the RCS 101 along with the RFN timing. The RCS processing unit 103 receives these signals through the RFN value inquiry unit 104 and performs appropriate processing.

In the first embodiment configured as described above, communication relating to an RFN value is performed between the RCS 101 and the UPS 102 only when the RCS processing unit 103 required RFN timing. Consequently, the efficiency of communication between them is improved.

A second embodiment of the present invention will be described below with reference to FIG. 4(b).

In the second embodiment, an RFN value correction unit 107 is added to the RCS 101 described with respect to the first embodiment as shown in FIG. 4(a). The other components of the configuration are the same as those shown in FIG. 4(a), and are therefore labeled with the same reference numerals and the description of which will be omitted here.

In the second embodiment, RFN timing sent from the UPS 102 is sent to the RFN value correction unit 107, where it is corrected. The correction is performed in order to compensate for a propagation delay between the RCS 101 and the UPS 102.

The second embodiment configured as described above has, in addition to the advantage of the first embodiment, the advantage that control is provided through the use of a more precise RFN value.

A third embodiment of the present invention will be described below with reference to FIG. 5(a), which shows a configuration thereof.

Figure 5:
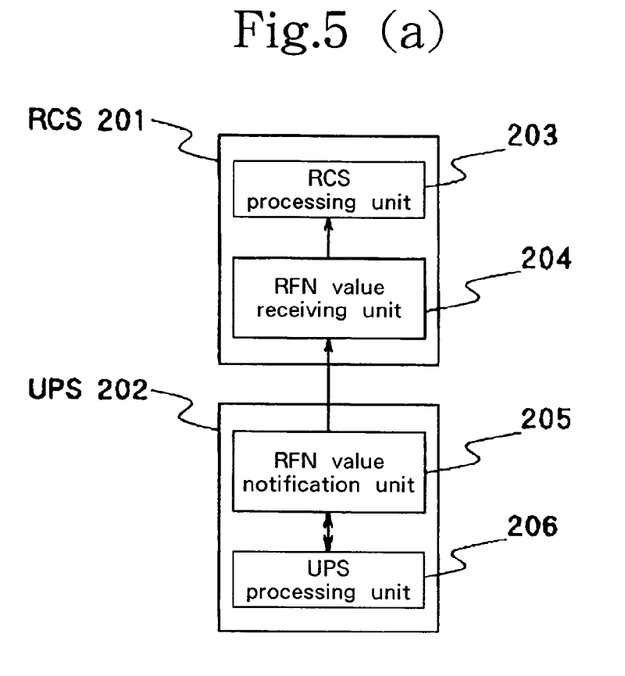

The embodiment shown in FIG. 5(a) comprises an RCS 201 and a UPS 202. The RCS 201 comprises an RCS processing unit 203 which performs processing required for functioning as an RCS and an RFN value receiving unit 204. The UPS 202 comprises a UPS processing unit 206 which performs processing required for functioning as a UPS and an RFN value notification unit 205.

Among items of timing information, Tcell, frame offsets, and chip offsets are specified by the RCS processing unit 203. RFN timing is managed by the UPS processing unit 206. The RFN value notification unit 205 periodically reads RFN timing from the UPS processing unit 206 and sends it to the RCS 201. It sends the phase difference between RFN and BFN obtained by the UPS processing unit 206 from the result of Node synchronization to the RCS 201 along with the RFN timing. The RCS processing unit 203 receives these signals through the RFN value receiving unit 204 and performs appropriate processing.

In the third embodiment configured as described above, RFN timing is periodically sent to the RCS, unlike in the first and second embodiments. Consequently, the need for the RCS processing unit 203 to inquire about RFN timing is eliminated and therefore the communication control arrangement can be simplified.

A fourth embodiment of the present invention will be described below with reference to FIG. 5(b), which shows a configuration thereof.

In the fourth embodiment, an RFN value correction unit 207 is added to the RCS 201 described with respect to the third embodiment. The other components of the configuration are the same as those shown in FIG. 5(a), and are therefore labeled with the same reference numerals and the description of which will be omitted here.

In the fourth embodiment, RFN timing sent from the UPS 102 is sent to the RFN value correction unit 207, where it is corrected. The correction is performed in order to compensate for a propagation delay between the RCS 201 and the UPS 202.

The fourth embodiment configured as described above has, in addition to the advantage of the third embodiment, the advantage that control is provided through the use of a more precise RFN value.

A fifth embodiment of the present invention will be described with reference to FIG. 6, which shows a configuration thereof.

The fifth embodiment comprises time information sending means 301, which sends information indicating a time to an RCS 302 and a UPS 308.

The RCS 302 comprises an RCS processing unit 306 which performs processing required for functioning as an RCS, an RFN value inquiry unit 307, a time information receiving unit 303 which receives time information from the time information sending means 301, a clock 305, and a clock control unit 304 which adjusts the time of clock 305 to time information received at the time information receiving unit 303.

The UPS 308 comprises a UPS processing unit 309 which performs processing required for functioning as a UPS, an RFN value notification unit 313, a time information receiving unit 310 which receives time information from the time information sending means 301, a clock 312, and a clock control unit 311 which adjusts the time of the clock 312 to time information received at the time information receiving unit 310.

Among items of timing information, Tcell, frame offsets, and chip offsets are specified by the RCS processing unit 306. RFN timing is managed by the UPS processing unit 309. The RCS processing unit 306 inquires about an RFN value through the RFN value inquiry unit 307 to the UPS 308 when the RCS processing unit 306 requires RFN timing. The inquiry is received at the RFN value notification unit 313. The RFN value notification unit 313 reads the RFN timing from the UPS processing unit 309 and sends it to the RCS 302. It sends the phase difference between RFN and BFN obtained by the UPS processing unit 309 from the result of Node synchronization to the RCS 302 along with the RFN timing. The RCS processing unit 306 receives these signals through the RFN value inquiry unit 307 and performs appropriate processing.

The time of the clock 305 built into the RCS 302 and the time of the clock 312 built into the UPS 308 are synchronized with each other through the use of timing information sent from the time information sending means 301. Time information from the clock 312 is added to information sent from the UPS 308 to the RCS 302. The RCS processing unit 306 calculates an RFN value from the information it received and time information from the clock 305 and the UPS 308 and performs processing.

Methods for calculating an RFN value when information is sent and received according to the present invention will be described below.

Method 1: Reporting Phase Difference

The UPS processing unit 309 and the RCS processing unit 306 use the same method to calculate a frame number from the clock 312 and 305 in the UPS 308 and the RCS 302, respectively, (hereinafter referred to as an own-clock frame number) in a 4096 frame period with a 10-ms interval.

Because the clock 312 provided in the UPS 308 and the clock 305 provided in the RCS 302 are synchronized with each other, the own-clock frame numbers calculated will be virtually the same. An example of a formula is shown below.

Own-clock frame number of UPS 308, RCS 302=(current time expressed in 10 ms) mod 4096

The UPS processing unit 309 indicates the following phase difference between an RFN value and a UPS own-clock frame number that it controls to the RCS 302.

Phase difference=(RFN−UPS own-clock frame number) mod 4096

The RCS processing unit 306 uses the phase difference value received from the UPS 308 to obtain the RFN value at the current time by the following calculation:

RFN value=(RCS own-clock frame number+phase difference) mod 4096

The RFN value obtained by the RCS processing unit 306 varies depending on the precision of the clocks 312 and 305 in the UPS 308 and the RCS 302 to which it synchronizes. However, the precision of the RFN value required by the RCS processing unit 306 is low compared with the one required by the UPS processing unit 309 and therefore synchronization with an acceptable error will suffice. Typically, an error of several frames is acceptable.

Method 2: Reporting Current RFN Value

The UPS processing unit 309 and the RCS processing unit 306 use the same method to calculate an own-clock frame number from the clock 312 and 305 in the UPS 308 and the RCS 302, respectively, in a 4096 frame period with a 10-ms interval.

Because the clock 312 provided in the UPS 308 and the clock 305 provided in the RCS 302 are synchronized with each other, the own-clock frame numbers calculated will be virtually the same. An example of a formula used is shown in below.

Own-clock frame number of UPS 308, RCS 302− (current time expressed in 10 ms) mod 4096

The UPS processing unit 309 indicates the correspondence between an RFN value and a UPS own-clock value it controls to the RCS 302: (RFN, UPS own-clock time)

The RCS processing unit 306 calculates the RFN value at the current time from the correspondence between the RFN value and the UPS own-clock value received from the UPS 308.

For example, the RFN value can be calculated as follows:

RFN (UPS)=RFN value received from UPS

TIME (UPS)=UPS own-clock time (in 10 ms)

TIME (RCS)=RCS own-clock current time (in 10 ms)

RFN value=[RFN (UPS)+[TIME (RCS)−TIME (UPS)]] mod 4096

The RFN value obtained by the RCS processing unit 306 varies depending on the precision of the clocks to which the UPS and RCS synchronizes. However, the precision of the RFN value required by the RCS is low compared with the one required by the UPS and therefore synchronization with an acceptable error will suffice. Typically, an error of several frames is acceptable.

Figure 7:
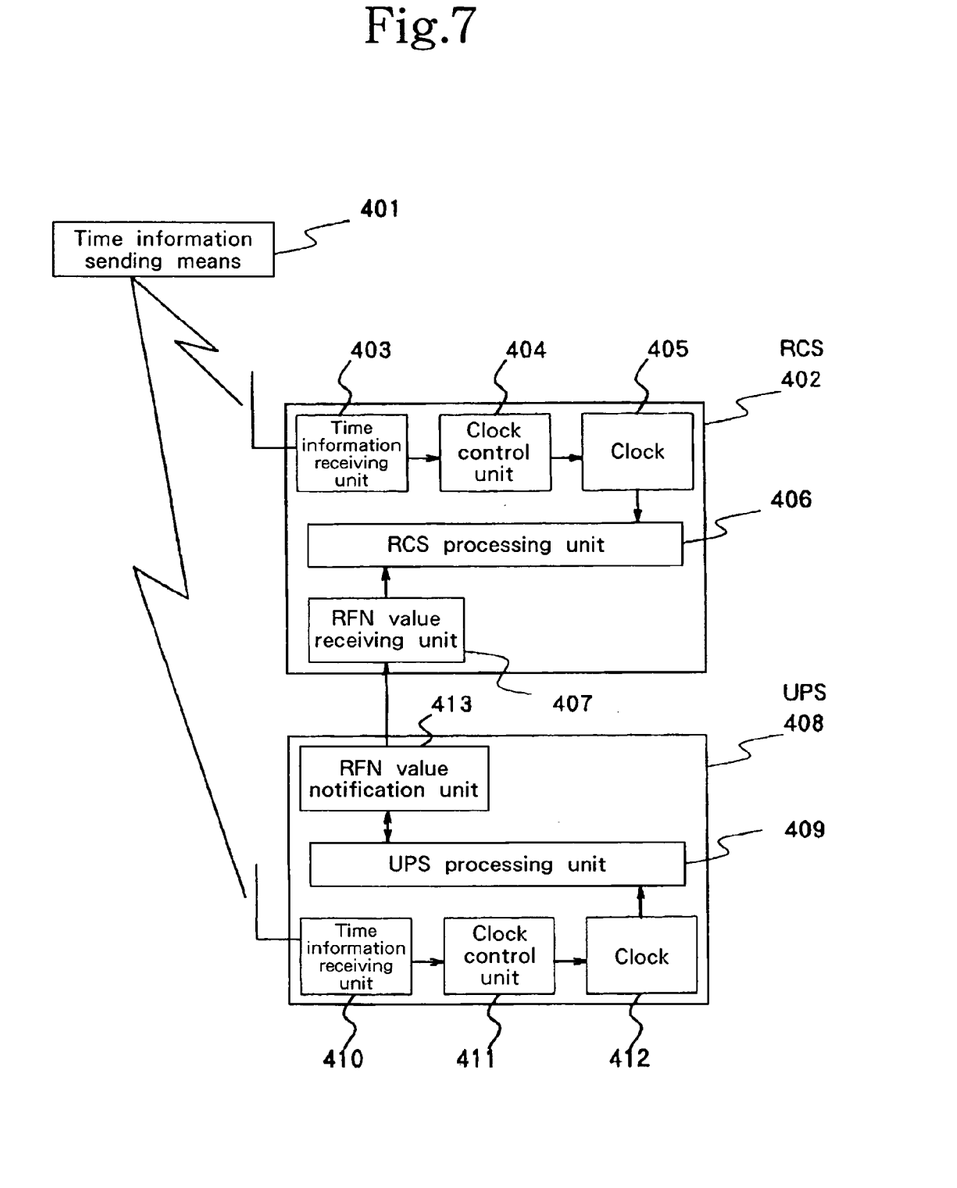
FIG. 7 shows a configuration of a relevant part of a sixth embodiment of the present invention.

A sixth embodiment of the present invention will be described with reference to FIG. 7, which shows a configuration thereof.

Figure 6:
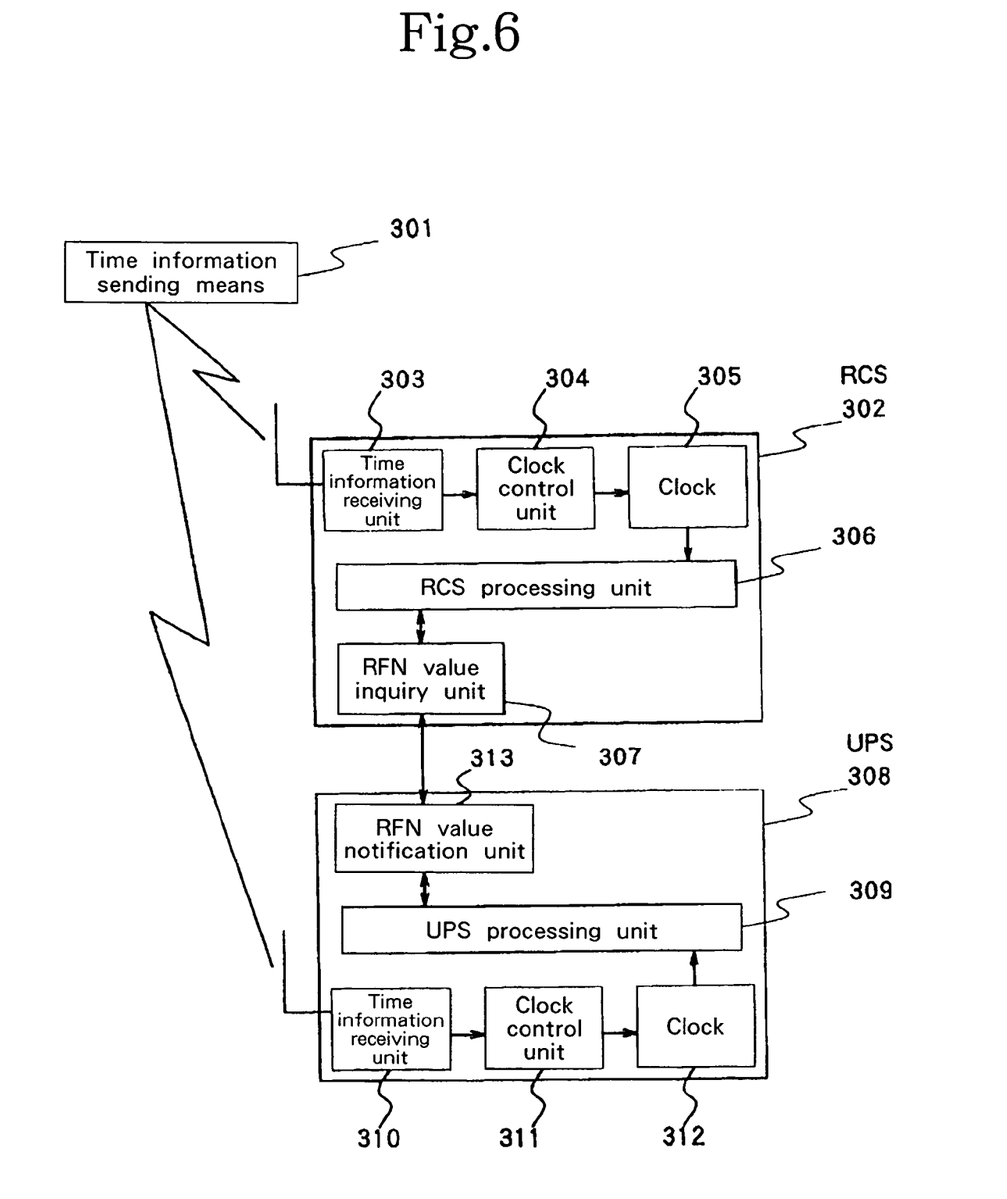
FIG. 6 shows a configuration of a relevant part of a fifth embodiment of the present invention.

Time information sending means 401, an RCS 402, time information receiving units 403, 410, clock controlling units 404, 411, clocks 405, 412, a UPS 408, an RCS processing unit 406, and a UPS processing unit 409 in the sixth embodiment are the same as the time information sending means 301, RCS 302, time information receiving units 303, 310, clock control units 304, 311, clocks 305, 312, UPS 308, RCS processing unit 306, and UPS processing unit 309 in the fifth embodiment shown in FIG. 6.

Among items of timing information in the sixth embodiment, Tcell, frame offsets, and chip offsets are values specified by the RCS processing unit 460. RFN timing is managed by the UPS processing unit 409. The RFN value notification unit 413 reads RFN timing from the UPS processing unit 409 and sends it to the RCS 402. It sends the phase difference between RFN and BFN obtained by the UPS processing unit 406 from the result of Node synchronization to the RCS 402 along with the RFN timing. The RCS processing unit 406 receives these signals through the RFN value receiving unit 407 and performs appropriate processing.

Also in the sixth embodiment, the time of the clocks 405 built in the RCS 402 and the time of the clock 412 built in the UPS 412 are synchronized with each other through the use of time information sent from the time information sending means 401. Time information from the clock 412 is added to information sent from the UPS 408 to the RCS 402. The RCS processing unit 406 calculates an RFN value from the information it received and time information from the clock 405 and performs processing.

The calculation of the RFN value is accomplished according to the method 1 or 2 in the fifth embodiment shown in FIG. 6.

While the UPS 408 periodically sends notification of a phase difference to the RCS 402 in the embodiment, it may send notification to the RCS 402 only when a change occurs in the phase difference. This arrangement allows the RCS 402 to always know an RFN value managed by the UPS 408.

In a method in which the UPS simply sends the current RFN value to the RCS as in the first and third embodiments, fluctuations in propagation delay and processing delay may have to be accommodated, depending on the communication distance or propergation delay. While a correction circuit is provided for correcting such fluctuations in the second and fourth embodiments, complicated correction is involved.

In the fifth and sixth embodiment configured as described above, a propagation delay between the RCS and UPS presents no problem and therefore a correction circuit as in the second and fourth embodiments is not required.

Time information sending means for synchronizing the clocks built in a UPS and RCS may be GPS (Global Positioning System), NTP (Network Time Protocol), standard time broadcast used for radio wave clocks, FM broadcast, or any other means. Furthermore, time synchronization that can substitute as clocks may be used in place of the clocks.

GPS can globally provide time synchronization in a wide range with a very small error by using satellites. The error range of GPS-based time synchronization is approximately 100 ns. However, GPS can be used only in an environment in which radio waves from the satellites can be received.

NTP is used to synchronize the time of a device to an NTP server in an internet-based network. It can provide clock synchronization with consideration given to propagation delays in information transmission.

Standard time broadcast uses long or short waves to indicate a time. An advantage of the standard time broadcast is that an error in an indicated time is small. A problem with the standard time broadcast is that an error due to propagation time affects synchronization. However, an error can be corrected from the distance between the position at which a radio wave is emitted and the position at which a UPS or RCS is located.

FM-broadcast-based time synchronization uses time information broadcasted from an FM radio station to provide time synchronization. It can provide synchronization with precisions ranging from 10 ms to 30 ms.

Using any of these technologies, clocks built in a UPS and RCS are synchronized with each other, the UPS can indicate the correspondence between an RFN value and a built-in clock to the RCS, and the RCS can indirectly know the RFN value as the correspondence to the clock built in the RCS. It is not necessarily required that the clocks be synchronized directly to the RFN of the UPS. Preferably the built-in clocks are completely independent from the RFN value.

The RFN timing of a UPS and the BFN timing of Node B are required to be highly precise because they directly affect radio frame timing. In contrast, the RCS can know the RFN value of the UPS even if the precision of the built-in clocks of a UPS and RSC is not so high.

Because the RCS has only to know an RFN value on a frame basis (in 10 ms), precisions of several to several tens ms may be sufficient for most systems. If the RCS is implemented by a personal computer or workstation, then its built-in clock can be used without modification because the RCS does not require a high-precision clock.

The present invention configured as described above has an advantage that RFN timing can be passed between a UPS and RCS in an efficient manner.

If a correction circuit is added, highly precise RFN value passing can be achieved.

Furthermore, if time information sending means is provided, highly precise RFN value passing can be achieved with a simple configuration.

What is claimed is:

1. A mobile communication system comprising:
   a mobile terminal;
   a radio base station device communicating with said terminal over a radio link;
   first control means controlling said radio base station and performing signaling transfer control; and
   second control means provided physically separately from said first control means for performing user data transfer control relating to said terminal;
   wherein:
   said first control means includes inquiry means for sending an inquiry signal for inquiring about timing information of said second control means, said timing information being required for signaling transfer control and being managed by said second control means; and
   said second control means includes sending means for sending said timing information to said first control means when said second control means receives said inquiry signal.

2. The mobile communication system according to claim 1, wherein said first control means includes correction means for compensating the timing information sent from said second control means.

3. A mobile communication system comprising:
   a mobile terminal;
   a radio base station device communicating with said mobile terminal over a radio link;
   first control means controlling said radio base station and performing signaling transfer control; and
   second control means provided physically separately from said first control means for performing user data transfer control relating to said terminal;
   wherein:
   said second control means manages timing information required for signaling transfer control by said first control means and includes sending means for periodically sending said timing information to said first control means.

4. The mobile communication system according to claim 2, wherein said first control means includes correction means for compensating the timing information sent from said second control means.

5. A mobile communication system comprising:
   a mobile terminal;
   a radio base station device communicating with said mobile terminal over a radio link;
   first control means controlling said radio base station and performing signaling transfer control; and
   second control means provided physically separately from said first control means for performing user data transfer control relating to said terminal;
   wherein:
   said mobile communication system includes time information sending means for sending time information;
   said first and second control means each includes clock control means for synchronizing the time of a clock built in said first control means and the time of a clock built in said second control means by using said time information;
   said first control means includes inquiry means for sending an inquiry signal for inquiring about timing information of said second control means, said timing information being required for signaling transfer control and being managed by said second control means;
   said second control means includes sending means for sending said timing information associating with the time of the clock built in said second control means to said first control means when said second control means receives said inquiry signal; and
   said first control means calculates the current timing information from said timing information and the time of the clock built in said first control means to perform signaling transfer control.

6. A mobile communication system comprising:
   a mobile terminal;
   a radio base station device communicating with said mobile terminal over a radio link;
   first control means controlling said radio base station and performing signaling transfer control; and
   second control means provided physically separately from said first control means for performing user data transfer control relating to said terminal;
   wherein:
   said mobile communication system includes time information sending means for sending time information;
   said first and second control means each includes clock control means for synchronizing the time of a clock built in said first control means and the time of a clock built in said second control means by using said time information;

said second control means manages timing information required for signaling transfer control by said first control means and includes sending means for associating said timing information with the time of the clock built in said second control means and periodically sending said timing information to said first control means; and said first control means calculates the current timing information from said timing information and the time of the clock built in said first control means to perform signaling transfer control.

7. A radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

said first control means includes inquiry means for sending an inquiry signal for inquiring about timing information of said second control means, said timing information being required for signaling transfer control and being managed by said second control means; and said second control means includes sending means for sending said timing information to said first control means when said second control means receives said inquiry signal;

said first and second control means each includes clock control means for synchronizing the time of a clock built in said first control means and the time of a clock built in said second control means by using said time information, wherein said first control means includes correction means for compensating said timing information sent from said second control means.

8. A radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

said second control means manages timing information required for signaling transfer control by said first control means and includes sending means for periodically sending said timing information to said first control means; said first and second control means each includes clock control means for synchronizing the time of a clock built in said first control means and the time of a clock built in said second control means by using said time information, wherein said first control means includes correction means for compensating said timing information sent from said second control means.

9. A radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

said radio base station control system includes a time information sending means for sending time information;

said first and second control means each includes clock control means for synchronizing the time of a clock built in said first control means and the time of a clock built in said second control means by using said time information;

said first control means includes inquiry means for sending an inquiry signal for inquiring about timing information of said second control means, said timing information being required for signaling transfer control and being managed by said second control means;

said second control means includes sending means for sending said timing information associating with the time of the clock built in said second control means to said first control means when said second control means receives said inquiry signal; and said first control means calculates the current timing information from said timing information and the time of the clock built in said first control means to perform signaling transfer control.

10. A radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

said radio base station control system includes a time information sending means for sending time information;

said first and second control means each includes clock control means for synchronizing the time of a clock built in said first control means and the time of a clock built in said second control means by using said time information;

said second control means manages timing information required for signaling transfer control by said first control means and includes sending means for associating said timing information with the time of the clock built in said second control means and periodically sending said timing information to said first control means; and said first control means calculates the current timing information from said timing information and the time of the clock built in said first control means to perform signaling transfer control.

11. A radio base station control method in a radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

inquiry means is provided in said first control means for sending an inquiry signal for inquiring about timing information of said second control means, said timing information being required for signaling transfer control and being managed by said second control means; and sending means is provided in said second control means for sending said timing information to said first control means when said second control means receives said inquiry signal;

wherein:

time information sending means for sending time information is provided; clock control means is provided in each of said first and second control means for synchronizing the time of a clock built in said first control means and the time of a clock built in said second control means by using said time information, wherein correction means is provided in said first control means for compensating the timing information sent from said second control means.

12. A radio base station control method in a radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

said second control means manages timing information required for signaling transfer control by said first control means, and sending means is provided in said second control means for periodically sending the timing information to said first control means;

wherein:

time information sending means for sending time information is provided;

clock control means is provided in each of said first and second control means for synchronizing the time of a clock built in said first control means and the time of a clock built in said second control means by using said time information, wherein correction means is provided in said first control means for compensating the timing information sent from said second control means.

13. A radio base station control method in a radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

time information sending means for sending time information is provided;

clock control means is provided in each of said first and second control means for synchronizing the time of a clock built in said first control means and the time of a clock built in said second control means by using said time information;

inquiry means is provided in said first control means for sending an inquiry signal for inquiring about timing information of said second control means, said timing information being required for signaling transfer control and being managed by said second control means;

sending means is provided in said second control means for sending said timing information associating with the time of the clock built in said second control means to said first control means when said second control means receives said inquiry signal; and said first control means calculates the current timing information from said timing information and the time of the clock built in said first control means to perform signaling transfer control.

14. A radio base station control method in a radio base station control system that controls a radio base station device communicating with a mobile terminal over a radio link and comprises first control means performing signaling transfer control and second control means performing user data transfer control relating to said terminal, said first and second control means being provided physically separated from each other;

wherein:

time information sending means for sending time information is provided;

clock control means is provided in each of said first and second control means for synchronizing the time of a clock built in said first control means and the time of a clock built in said second control means by using said time information;

said second control means manages timing information required for signaling transfer control by said first control means and includes sending means for associating said timing information with the time of the clock built in said second control means and periodically sending said timing information to said first control means; and said first control means calculates the current timing information from said timing information and the time of the clock built in said first control means to perform signaling transfer control.

* * * * *